Figure 1:
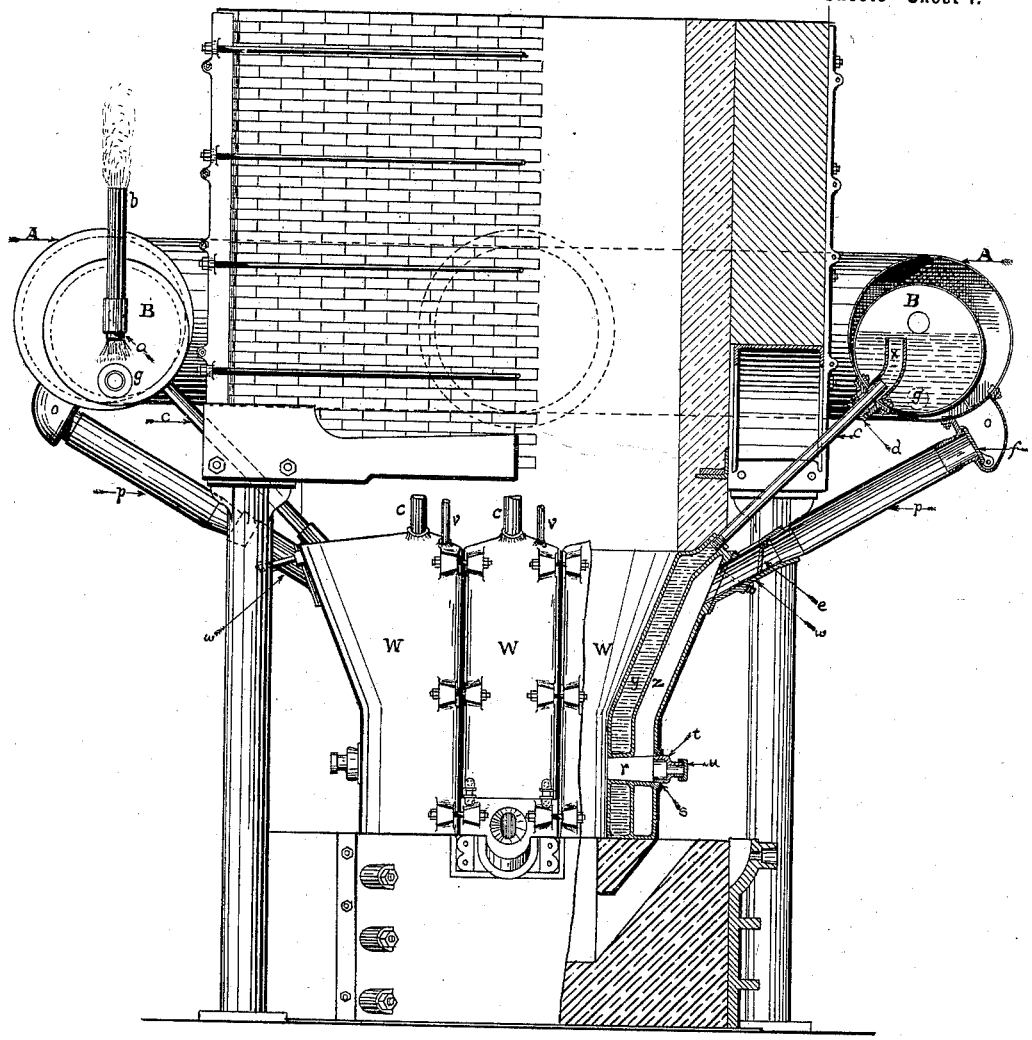

No. 612,754. Patented Oct. 18, 1898.
J. W. NESMITH.
BLAST FURNACE.
(Application filed Sept. 7, 1897.)
(No Model.) 3 Sheets—Sheet 1.

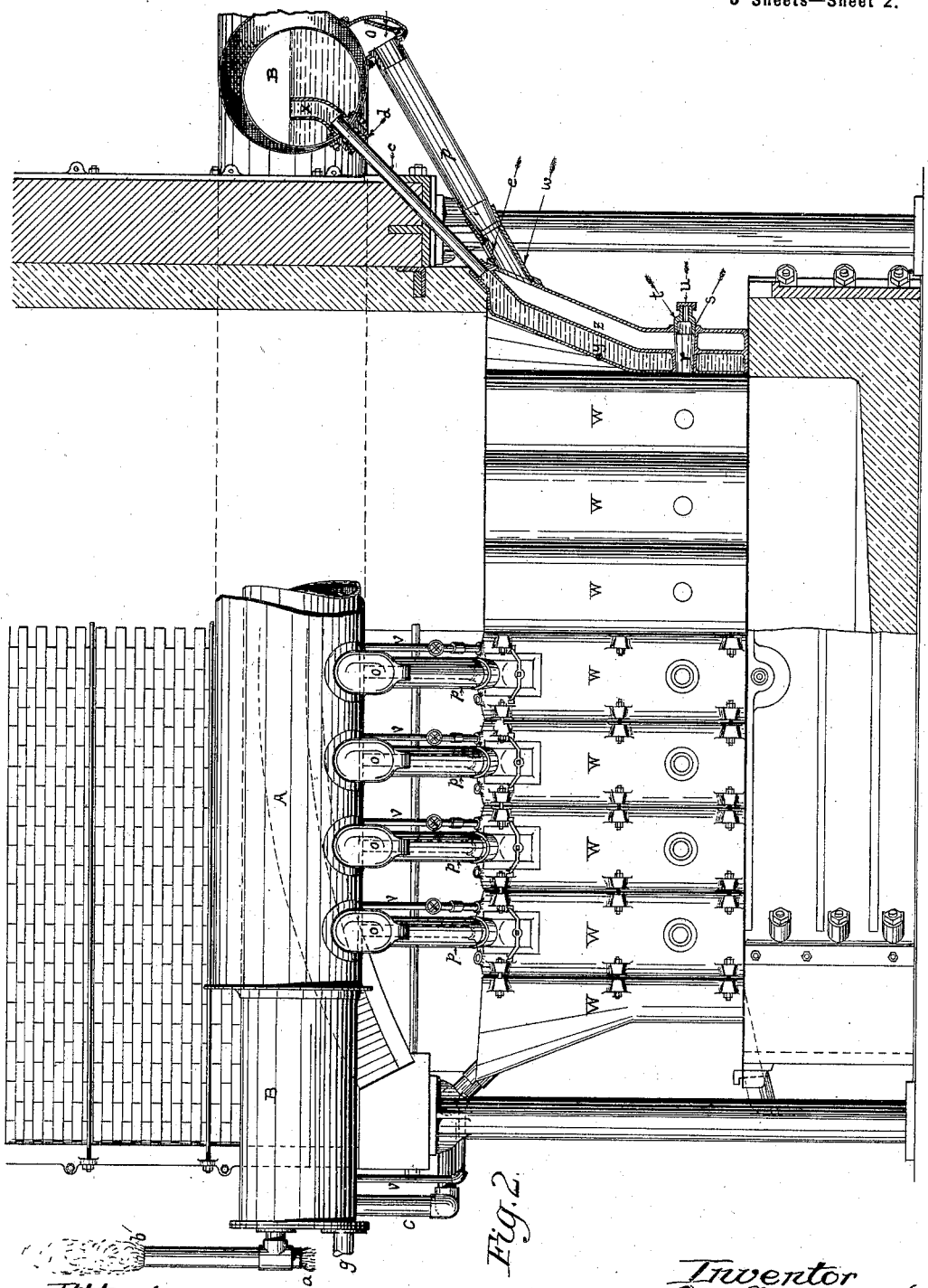

No. 612,754. Patented Oct. 18, 1898.
J. W. NESMITH.
BLAST FURNACE.
(Application filed Sept. 7, 1897.)
(No Model.) 3 Sheets—Sheet 3.
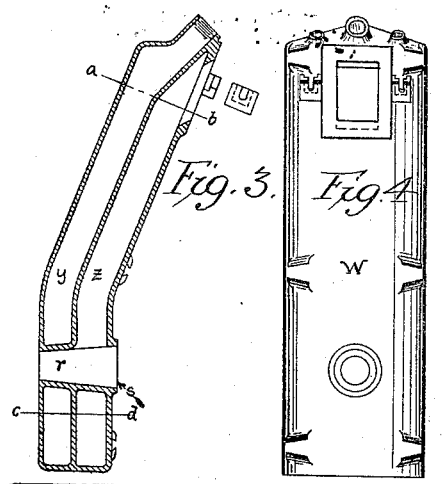
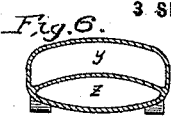
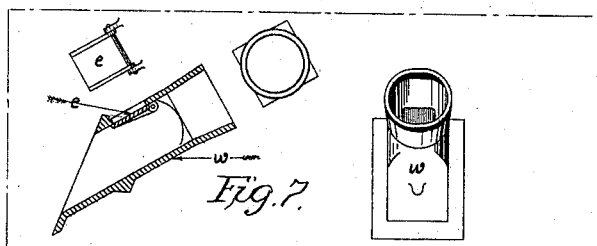
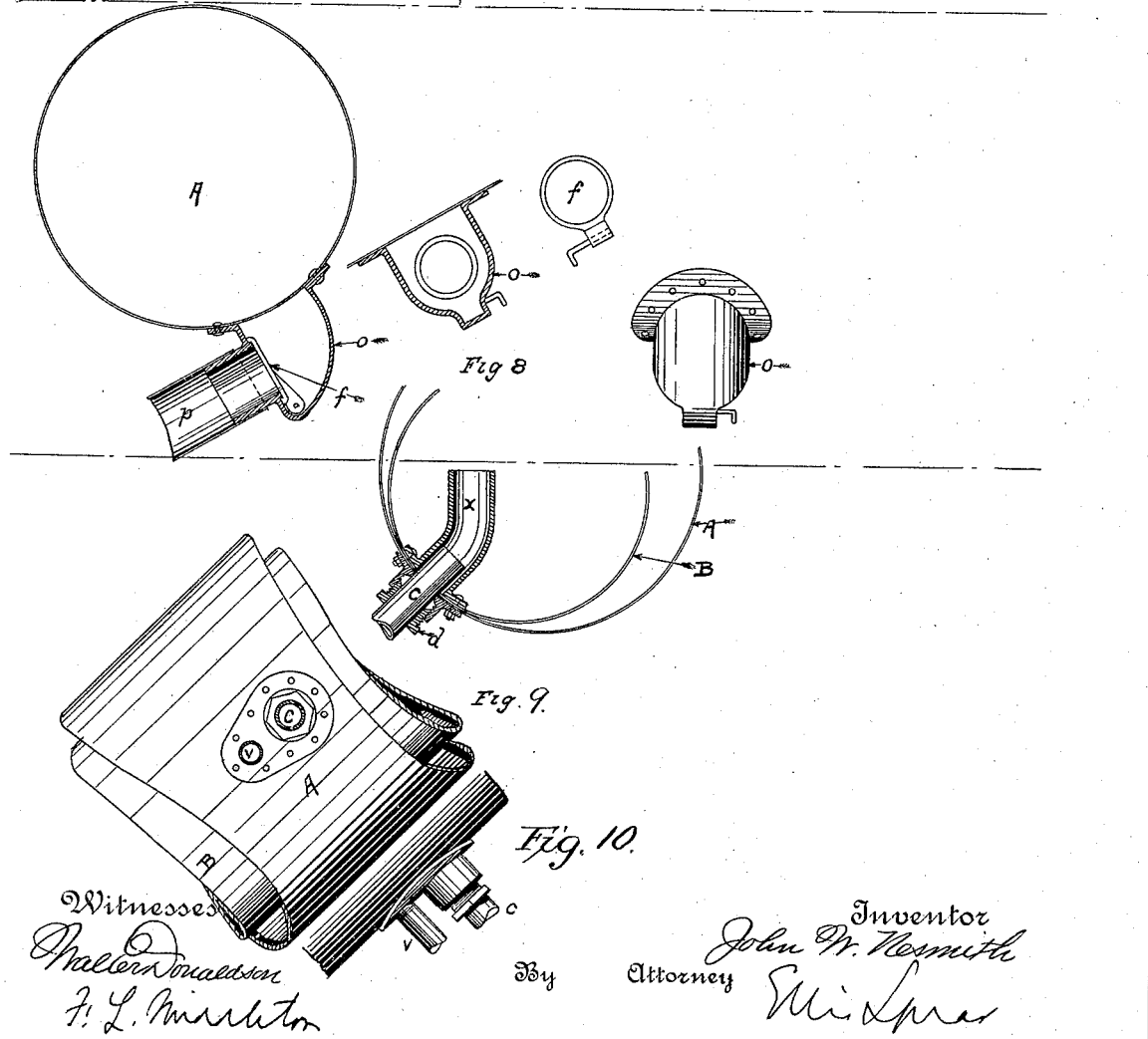
Witnesses
Inventor
John W. Nesmith
By Attorney

UNITED STATES PATENT OFFICE.

JOHN W. NESMITH, OF DENVER, COLORADO, ASSIGNOR TO THE COLORADO IRON WORKS COMPANY, OF SAME PLACE.

BLAST-FURNACE.

SPECIFICATION forming part of Letters Patent No. 612,754, dated October 18, 1898.

Application filed September 7, 1897. Serial No. 650,806. (No model.)

*To all whom it may concern:*

Be it known that I, JOHN W. NESMITH, a citizen of the United States, residing at Denver, Colorado, have invented certain new and useful Improvements in Blast-Furnaces, of which the following is a specification.

This invention is an improvement in blast-furnaces applicable particularly to the class of water-jacketed blast-furnaces wherein the ores of lead, silver, copper, and gold are smelted.

There are localities where there is a scarcity of water and difficulty is had in getting enough for cooling the water-jackets of furnaces in the usual way, and even where the water is caught in ponds or tanks to be used over and over again there is often still a shortage on account of the waste. In other places the necessary water is purchased from the city water companies at great cost.

It is the primary object of my present invention to provide a construction adapted to effect a very great saving of water; but the invention also includes other and important features of construction, all as hereinafter described.

In carrying out my invention advantage is taken of the latent heat of steam, which is nine hundred and sixty-six heat units—that is to say, one pound of water at 212° Fahrenheit absorbs nine hundred and sixty-six heat units in evaporating to steam at the same indicated or sensible temperature—to wit, 212°. Allowing the water to be supplied to the jackets at 62° and discharged at boiling—to wit, 212°—there has been absorbed by each pound of water but 150°, or one hundred and fifty heat units, which is all that is possible to get where water instead of steam is discharged from the jackets. If evaporated to steam from initial temperature of 62°, we have thus for one pound of water one hundred and fifty units to boiling at 212° plus nine hundred and sixty-six units in evaporating to steam still at 212° indicated temperature, which equals eleven hundred and sixteen heat units—that is to say, each pound of water has gained nine hundred and sixty-six units of heat without the jackets becoming any hotter than as though discharging boiling water. The proportion of gain in cooling efficiency or water saved is then nine hundred and sixty-six heat units, or nine hundred and sixty-six plus one hundred and fifty equals eleven hundred and sixteen. Thus it will be seen that 7.44 times as much water is used if discharged boiling from the jackets as would be used if the water is evaporated and discharged as steam, with the further result that the jackets get no hotter in evaporating the water to steam than by simply discharging the boiling water from them. In other words, I use but a trifle more than one-eighth the amount of water by evaporating it than would have been used by discharging it boiling from the jackets, and as in common practice water is but seldom discharged from the jackets as hot as 212° the amount required for evaporation will fall below one-eighth that usually used for cooling and will have kept the jackets at the same temperature in the one case as in the other.

In the drawings, Figure 1 is an end elevation, partly in section. Fig. 2 is a longitudinal elevation, partly in section, of an ordinary silver-lead blast-furnace, showing the improvements of the present invention. Figs. 3, 4, 5, and 6 show details of the water-jacket; Fig. 7, details of the safety-valve; Fig. 8, details of the valve controlling the blast to the twyers, and Figs. 9 and 10 show sections of the drum and bustle-pipe and the pipe connections therewith.

In carrying out my invention practically I prefer to connect all the sections or jackets by means of pipes to one or more tanks, reservoirs, or drums. A simple and efficient means is to connect the jackets by means of suitable pipes to a horizontal drum B on each side of the furnace, as shown. The jackets and pipes are thus kept full of water, and the water-level is maintained near the center of the drum B and the separation of steam takes place in the drum, the escape-pipe *b* at the end leading the steam away to the open air. All the jackets are connected with the bottom of the drum, and thus no one of them can run short of water by any possibility unless they all do so. A very compact and complete arrangement is, as shown, to place the evaporating-drums B inside the bustle or blast pipes A, which latter must of course be large enough to accommodate the drums B with ample space around them to allow free passage of the air-blast. By this means the drum B, being exposed to the air-blast within the bustle-pipe A, becomes a surface condenser, and much of the steam is condensed back into water in the drum and thus saved, while the heat absorbed by the air-blast goes forward into the furnace. The advantage of the warm-air blast in the much-improved working of a furnace, though its heat may not exceed 200° Fahrenheit, is by far greater than can be accounted for by the caloric value of the heat thus saved and returned to the furnace.

Cold water enters the evaporating-drums B at the bottom through the pipes $g$ and flows down into the water-jacket sections W through the pipes $v$, Figs. 2 and 10. The cold water flows constantly downward through the pipes $v$, being heavier, while the heated expanded water flows upward from the jackets through the pipes $c$ and the curved pipe $x$ and is discharged, as shown, at the surface of the water in the drum B, where evaporation takes place. A constant positive circulation of water in the jackets is thus maintained.

The heated water from the tops of the jackets W is discharged into the drum B through the hot-water-discharge pipes $c$. These pipes $c$ are fitted with stuffing-boxes $d$ where they connect with the drum, thus allowing a tight connection to be always kept between the drum and the jackets, notwithstanding expansion or change from any cause in relative position. These hot-water pipes from the jackets terminate inside the drum in short sections of curved pipe $x$, riveted or bolted permanently to the inside of the drum B. These short sections $x$ are for the purpose of delivering the hot discharge-water from the jackets to the surface of the water in the drum where evaporation takes place. At the end of the drum, Figs. 1 and 2, I arrange a T $b$, with a discharge-pipe $b'$ for the steam. Any surplus of water passes through and falls downward at $a$ and is carried away by a suitable pipe.

The air-pipe enters the bustle-pipe A at any convenient point and passes on into the several jackets W through branch pipes $p$, Figs. 1 and 2, connected by suitable valve-chambers $o$, riveted to the bustle-pipe A. These valve-chambers are supplied with clack-valves $f$, having stems and handles (not shown) conveniently opened and closed by hand. The branch pipes $p$ connect the valve-chambers $o$ with valve-boxes $w$ on the jackets W, and each valve-box $w$ is supplied with a clack-valve $e$, which opens inward or downward by its own weight when the blower stops or when the clack-valve $f$ is closed, stopping the blast and relieving it of pressure; but when the valve $f$ is open and blast-pressure is on the valve $e$ closes and the blast passes on into the back chamber $z$ of the jacket, and thence through the twyer and into the furnace. The clack-valve $e$ thus forms a safety-valve to allow any inflammable gas to pass off to the atmosphere that may back out from the furnace through the twyer when blast is shut off at $f$. Thus when clack-valve $f$ is closed $e$ is always open. This makes a most convenient, simple, and absolutely safe arrangement.

In each of the water-jacket sections W is a partition dividing it into two chambers, Figs. 3, 5, and 6, one on the outside, $z$, into which the air is blown on its way to the furnace, the one on the inside, $y$, carrying the water. It consists simply in the addition of an air-chamber attached on the backs of ordinary jackets. The air-blast passes from the bustle-pipe A into the chamber $z$ through the pipe $p$. The twyer $r$ is through the water-jacket and is open to the air-chamber $z$, so that air blown into the chamber is free to pass into the furnace. A hole $s$, opening through the outer wall of the air-chamber, affords access to the twyer. This opening is closed with a taper-plug $t$, which can be removed instantly for barring the twyers when necessary, and the plug has a sight-hole $u$ through it. This construction of jacket simplifies the blast-pipe connections very much and dispenses entirely with the twyer-pipes and canvas bags in common use.

With this construction the furnace may be operated by evaporation in whole or in part or entirely by overflow, as may be desired. The construction presents a very effective arrangement for both air and water. The jackets are always supplied with water, so long as any have it, all being alike connected with the bottom of the drum B by the downpipes $v$, and thus the temperature is alike in all. The blast enters the furnace at the temperature of the discharge-water, whatever that may be, by reason of its exposure to the heated exterior surfaces of the drum B and chambers $z$ of the jacket-sections.

The construction is perfectly adapted not only to the evaporation system, but equally to the overflow system, no change whatever being necessary when changing from one system to the other. As the water-supply runs short evaporation at once begins automatically and continues to compensate for whatever shortage there may be until the supply dwindles away to one-eighth the ordinary supply necessary for overflow when discharging boiling water, and at that point all is evaporated and the supply must not run lower. There is no disadvantage whatever in evaporating the whole necessary for cooling the jackets, while there is much advantage in the system as pointed out above.

The heat of jackets will not be variable when evaporating or in any case where this system is used, as it is by the common method of discharging water when the supply turned on them is varied, and it is in fact no uncommon thing to see jackets discharging water below 140° Fahrenheit in the ordinary methods of supplying water to them. Such changing from hot to cool exerts severe strains on the jackets and a chilling influence on the furnace, appreciably retarding its proper action, thickening the chilled coating of smelted material or slag on the fire-surface of the jacket, and reducing furnace area to an extent.

It is the experience of every smelting-furnace metallurgist or foreman that every now and again the coating of slag and other fused material which chills and collects on the inner face of the jackets will thicken to two or three or four times the usual or normal thickness and will then let go and slide down, leaving the jackets bare, to again collect a coating of fused ore and slag. This makes an irregular working of the furnace. It is caused chiefly by changes in temperature of jackets, brought about by frequent change in amount of water being supplied to them. In the present system irregularities of this kind are avoided to a great extent, as the jacket temperature is maintained constant.

I claim—

1. In combination in a blast-furnace, a series of independent water-jackets, a drum or tank completely encircling said furnace and forming an elevated reservoir, a water-supply thereto, a series of pipes leading from the drum directly to said series of jackets, and a second series of discharge-pipes leading directly from the jackets to the drum, substantially as described.

2. In combination in a blast-furnace, a series of independent water-jackets, a drum or tank completely encircling said furnace, a water-supply connecting with said drum near the bottom, a series of pipes leading from the drum directly to said jackets, and a second series of discharge-pipes leading from the jackets upward to the drum, said discharge-pipes being extended upward within the tank above the water-supply, substantially as described.

3. In combination in a blast-furnace, a series of independent water-jackets, a drum or tank completely encircling said furnace and forming a reservoir, a water-supply thereto, a series of pipes leading from said tank directly to said series of jackets, a second series of discharge-pipes leading directly from the jackets to the drum, and a single discharge-outlet serving to discharge both steam and the overflow from the drum, substantially as described.

4. In a blast-furnace, a series of independent water-jackets having each an independent air-compartment in rear thereof, substantially as described.

5. In a blast-furnace, a series of independent water-jackets, each water-jacket having an independent air-chamber in rear thereof, a passage for the air through the water-chamber, and an air-supply for the air-chamber, substantially as described.

6. In a blast-furnace, a series of independent water-jackets having independent air-compartments in rear thereof, a series of air-pipes connecting with the series of independent air-chambers, a bustle-pipe in connection with the series of air-pipes, and intermediate valves between the bustle-pipe for controlling the air to the series of pipes, substantially as described.

7. A blast-furnace, a series of independent water-jackets and a series of independent air-chambers in rear of the water-jackets, a partition dividing the water and air chambers, a bustle-pipe completely encircling the furnace, a tank within the bustle-pipe having feed and discharge connections with the water-jackets and a series of air-pipes between the bustle-pipes and the air-chambers with discharge-openings from the air-chambers, substantially as described.

In testimony whereof I affix my signature in presence of two witnesses.

JOHN W. NESMITH.

Witnesses:
J. M. BIBLE,
JOHN McCANN.